United States Patent [19]

Wooters

[11] Patent Number: 4,867,289

[45] Date of Patent: Sep. 19, 1989

[54] VEHICLE BRAKE LOCK HAVING THROTTLE PEDAL RELEASE

[75] Inventor: Eldon W. Wooters, Lincoln, Nebr.

[73] Assignee: Outboard Marine Corporation, Waukegan, Ill.

[21] Appl. No.: 150,365

[22] Filed: Jan. 28, 1988

[51] Int. Cl.⁴ .............................................. B60K 41/20
[52] U.S. Cl. .................................. 192/1.31; 74/97 R; 74/529
[58] Field of Search ............................ 192/1.31, 13 A; 188/265; 74/97, 529; 180/271

[56] References Cited

U.S. PATENT DOCUMENTS

| | | | |
|---|---|---|---|
| 1,915,286 | 6/1933 | Bleustein | 188/265 X |
| 1,927,209 | 9/1933 | Gilmore | 74/529 X |
| 1,985,319 | 12/1934 | Gilmore | 192/1.31 X |
| 2,551,743 | 5/1951 | Huey | 192/1.31 |
| 2,816,633 | 12/1957 | Schumann | 74/529 X |
| 3,995,510 | 12/1976 | Yost | 74/478.5 |
| 4,218,936 | 8/1980 | Waggoner | 74/529 X |
| 4,310,064 | 1/1982 | Kazarian, Jr. | 74/478.5 X |
| 4,646,903 | 3/1987 | Han | 192/1.31 |

Primary Examiner—Rodney H. Bonck
Attorney, Agent, or Firm—Welsh & Katz, Ltd.

[57] ABSTRACT

A brake lock system for a motorized wheeled vehicle having a throttle pedal and a primary brake pedal operable to effect braking of the vehicle, includes a brake lock pedal supported proximate the primary brake pedal to enable actuation by the operator during application of foot pressure to the primary brake pedal. The brake local pedal is pivotally supported by an over-center linkage arrangement movable to an over-center condition in response to actuation of the brake lock pedal so as to lock the primary brake pedal in a braking condition. A release pin is operatively associated with the over-center linkage arrangement and responsive to actuation of the throttle pedal to release the over-center linkage arrangement and enable return of the primary brake pedal to a non-braking condition.

12 Claims, 2 Drawing Sheets

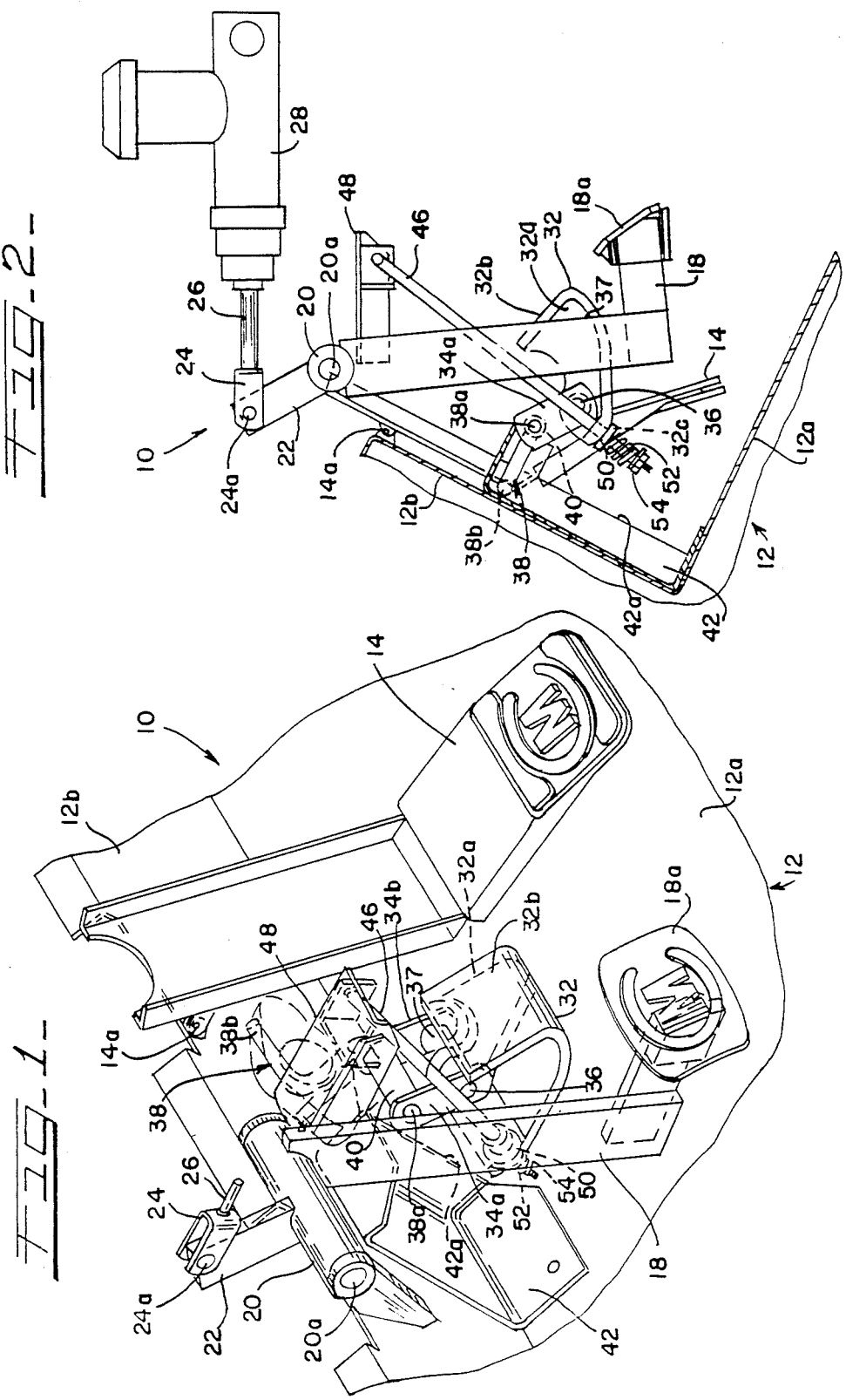

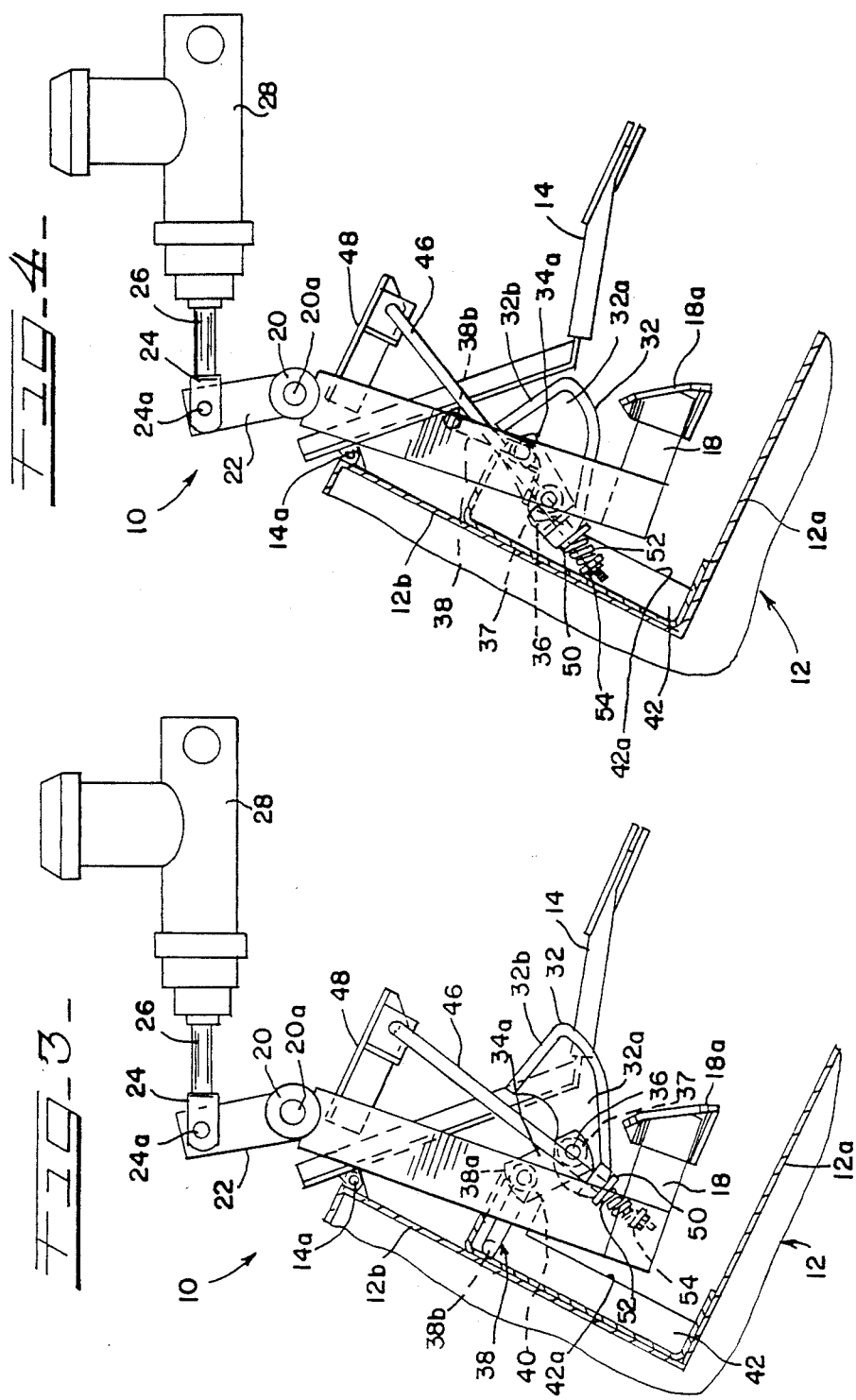

VEHICLE BRAKE LOCK HAVING THROTTLE PEDAL RELEASE

BACKGROUND OF THE INVENTION

The present invention relates generally to brake systems for motorized vehicles, and more particularly to a novel vehicle brake lock system employing a brake lock pedal selectively operable to maintain a primary service brake pedal in an applied brake condition and enable brake release upon actuation of the throttle pedal.

It is a common practice in the the manufacture and use of motor vehicles to employ a parking brake system or arrangement operative to maintain the primary brake system in a braked condition during parking and the like. Such parking brake systems frequently employ means associated with a primary brake pedal to enable selective retention of the brake pedal in its brake applying condition, while enabling release when the operator wishes to effect further movement of the vehicle. See, for example, U.S. Pat. Nos. 1,927,209, 1,985,319, 2,551,743, 2,816,333 and 4,218,936. U.S. Pat. No. 4,310,064 discloses a braking system which is particularly applicable in preventing creep of automatic-transmission wheeled vehicles.

In the case of relatively small size utility and recreational vehicles which undergo frequent stopping, such as golf carts and the like, it is particularly important from a safety standpoint that the vehicle be capable of maintaining a fixed stopped position when disposed on an upwardly or downwardly inclined grade. For example, safety regulations require that certain vehicles, such as golf carts, be capable of maintaining a braked condition on a 30% grade under full load. In the past, such vehicles have frequently employed mechanical braking systems which have the disadvantage that a substantial force must be applied by the operator to the primary brake pedal to effect braking, and a similar force is required to actuate an associated brake locking arrangement. These mechanical braking systems also require a relatively large force to release the brake lock. A further disadvantage resulting from the relatively large operating forces required to actuate and/or release mechanical braking systems is the need for high strength structural components to withstand continued service without associated maintenance problems.

To overcome the requirement for relatively large forces to actuate the service and/or parking brake mechanisms in mechanical brake systems, electrically actuated hydraulic brake lock systems have been developed which require relatively minimal operator force to actuate. Such systems have found particular use on heavy duty utility vehicles, such as waste collection trucks, but are relatively expensive. Thus, a need exists for an economical and reliable brake lock system which may be readily utilized with a primary service brake system on a wheeled vehicle, and which is relatively simple to actuate during braking and subsequent release to enable movement of the vehicle.

SUMMARY OF THE INVENTION

A general object of the present invention is to provide a novel brake lock system for a motorized vehicle which includes a brake lock pedal operative to maintain a primary service brake pedal in a braking condition, and which effects brake lock release upon actuating a throttle pedal.

A more particular object of the present invention is to provide a novel brake lock system which finds particular application with frequent stop vehicles and which employs a brake lock pedal and associated over-center linkage arrangement to maintain a primary brake pedal in a braking condition, the over-center linkage arrangement being responsive to actuation of a throttle pedal to release the primary brake pedal and enable movement of the vehicle.

In carrying out the present invention, a brake lock system is provided for a motorized vehicle having a speed control throttle pedal and a primary service brake pedal operative to effect braking of the vehicle. The brake lock system includes a brake lock pedal pivotally supported proximate the primary brake pedal and interconnected to the primary brake pedal through linkage means including an over-center linkage arrangement responsive to actuation of the brake lock pedal after initial actuation of the primary brake pedal to retain the primary brake pedal in a locked braking condition. The over-center linkage arrangement includes a release link responsive to actuation of the throttle pedal to release the primary brake pedal for return to a non-braking condition.

Further objects, features and advantages of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a fragmentary perspective view illustrating a brake lock system for a motorized vehicle in accordance with the present invention, the brake actuating cylinder being removed for clarity;

FIG. 2 is a fragmentary side elevational view of the brake lock system of FIG. 1 but illustrated in conjunction with a hydraulic brake cylinder and showing the throttle pedal in a fully actuated position;

FIG. 3 is a fragmentary side elevational view similar to FIG. 2 but illustrating the throttle pedal in a non-actuated conditions and the primary brake pedal in a braking position; and FIG. 4 is a fragmentary side elevational view similar to FIGS. 2 and 3 but illustrating the primary brake pedal and brake lock pedal in brake locking positions.

DETAILED DESCRIPTION

Referring now to the drawings, a brake lock system or arrangement for use with motorized vehicles is indicated generally at 10. The brake lock arrangement 10, which may alternatively be termed a parking brake system, is particularly adapted for use with motorized wheeled utility and recreational vehicles, such as golf carts and the like, which are used to traverse both level and hilly terrain and which are frequently stopped when on an upwardly or downwardly inclined grade while the operator and/or a passenger temporarily alights from the vehicle and thereafter reenters the vehicle for transport to another location. As aforementioned, legislative safety regulations have been enacted which require such vehicles to have brake lock systems enabling the operator to readily lock the vehicle brakes in a braked condition when the operator and/or a passenger alights from the vehicle so as to prevent accidental or inadvertent movement of the vehicle. Such parking brake systems are particularly desirable when the vehicle is powered by an internal combustion engine which may be left running while the operator alights temporarily from the vehicle.

In the illustrated embodiment, a fragmentary portion of a vehicle body or frame is indicated generally at 12 and includes a slightly upwardly inclined floor panel 12a and an upstanding wall panel 12b preferably made of suitable strength sheet metal or the like. A speed control throttle pedal 14 is pivotally supported by the upstanding panel 12b for pivotal movement about a transverse pivot axis 14a. The throttle pedal 14, which may alternatively be termed an accelerator pedal, is interconnected to vehicle power means in the form of an internal combustion engine or electric drive motor (not shown) in a manner to control the speed of travel of the vehicle in a conventional manner.

A primary service brake pedal 18 of generally L-shaped configuration has its upper end affixed in transverse relation to a tubular pivot sleeve 20 which, in turn, may be supported by the upstanding panel 12b for rotation about a transverse pivot shaft 20a. The brake pedal 18 has a pedal foot pad 18a enabling the operator to readily depress the brake pedal with his/her foot and effect rotation about the brake pedal pivot axis 20a. A brake actuating arm 22 is affixed radially to the pivot sleeve 20 and has a clevis 24 pivotally attached to its outer end at 24a. In the illustrated embodiment, the clevis 24 is affixed to the distal end of a piston or cylinder rod 26 of a conventional fluid pressure cylinder 28 (FIGS. 2-4), generally termed a brake master cylinder. The master cylinder 28 is connected in a hydraulic braking system or arrangement (not shown) selectively operable to brake the wheels of the vehicle with which the brake lock system 10 is employed. The piston rod 26 is biased outwardly from the master cylinder 28 through internal spring means (not shown) so as to bias the brake pedal 18 to its outward non-braking position as illustrated in FIGS. 1 and 2.

The components of the brake lock system 10 thus far described, namely, the throttle pedal 14, brake pedal 18 and associated master cylinder 28 are of generally conventional construction and enable selective speed control and braking of the associated vehicle through actuation of the throttle pedal and brake pedal independent of each other. In accordance with the present invention, a brake lock pedal 32 is pivotally supported proximate the primary service brake pedal 18 to enable the operator to readily engage the brake lock pedal with the toe of his/her foot during application of foot pressure to the foot pad 18a of the service brake pedal 18 to effect braking of the vehicle. In the illustrated embodiment, the brake pedal 32 is pivotally supported by a pair of identical parallel pivot or connecting links 34a and 34b which have their lower ends fixed to a transverse pivot shaft 36. A cylindrical sleeve 37 is rotatably supported on the shaft 36 and has a wall 32a of the brake pedal 32 affixed in normal relation thereto. The pivot shaft 36 and sleeve 37 lie substantially parallel to the brake pedal pivot axis 20a. The ends of the pivot links 34a,b opposite the pivot shaft 36 are affixed to a rectilinear end portion 38a of a generally S-shaped throttle release pin or shaft, indicated generally at 38. The throttle release pin or shaft 38 has an opposite end portion 38b which is laterally offset from and generally parallel to the end 38a so as to extend rearwardly of the throttle pedal 14 in its path of travel.

The end 38a of the S-shaped throttle release pin 38 is rotatably supported or journalled within a generally cylindrical support sleeve 40 which is fixed to the vehicle body 12 through a support bracket 42 so as to lie substantially parallel to the pivot axes 14a and 20a of the throttle pedal 14 and primary brake pedal 18. In this manner, the brake lock pedal 32 is supported by the pivot links 34a,b so as to enable pivotal movement about both of the pivot axis defined by the pivot shaft 36 and the pivot axis defined by the end 38a of the throttle release pin 38. The brake lock pedal is maintained in a generally constant elevational orientation as it pivots about the pivot axis 38a by a connecting rod 46 which interconnects the brake lock pedal 32 to the primary brake pedal 18. To this end, the upper end of the connecting rod 46 is pivotally connected to a connecting arm 48a which is fixed to and extends outwardly from the primary brake pedal 18 generally adjacent the pivot sleeve 20. The lower end of the connecting rod 46 extends freely through a suitable opening 32c in the brake lock pedal 32 (FIG. 2) and through an annular linear bearing 50 affixed to the brake lock pedal coaxially with the opening 32c so as to provide a slide bearing for the connecting rod.

A coil compression spring 52 is retained on a lower threaded end of the connecting rod 46 by a nut 54 so as to capture the compression spring between the nut and the linear bearing 50. The connecting rod 46, the compression spring 52 and the adjustable nut 54 are configured to allow the connecting rod to freely slide longitudinally through the linear bearing 50 with the compression spring 52 relaxed during normal actuation of the primary service brake to apply the vehicle brakes without actuation of the brake lock pedal 32 to initiate brake locking.

In operation of the parking brake system 10, and assuming that the vehicle brakes are in a non-braking condition, foot pressure applied by the operator to the throttle pedal 14 serves to pivot it about its pivot axis 14a to control the speed of the vehicle. The brake pedal 18 and brake lock pedal 32 are not affected by normal operation of the throttle pedal but remain in positions as illustrated in FIGS. 1 and 2. During normal service braking of the vehicle, foot pressure applied to the brake pedal foot pad 18a rotates the brake pedal about its pivot axis 20a and pressurizes the master cylinder 28 through the upper arm 22 ad cylinder rod 26 as depicted in FIG. 3. During such pivotal movement of the brake pedal, the connecting rod 46 slides through the linear bearing 50 on the brake lock pedal 32 and the compression spring 52 stays in a relaxed position so that when foot pressure is released from the service brake pedal 18, it returns to its normal outward position releasing the vehicle brakes.

When it is desired to lock the braking system in a brake condition, the operator applies foot pressure to the brake pedal 18 to apply the wheel brakes as aforedescribed. During actuation of the service brake pedal, rotation of the operator's foot to engage the brake lock pedal 32 forces the brake lock pedal to rotate with the links 34a,b about the pivot axis 38a until the cylindrical sleeve 37 on the pivot shaft 36 engages an edge surface 42a on the bracket 42 which serves as a stop surface to limit rearward rotation of the brake lock pedal. As the brake lock pedal 32 is rotated sufficiently to cause the sleeve 37 to engage the stop surface 42a, the connecting rod 46 undergoes an over-center movement relative to the pivot axis 38a. That is, the longitudinal axis of the connecting rod passes through a plane normal to FIG. 3 which contains the pivot axis between the upper end of the connecting rod and the arm 48, and the pivot axis for links 34a,b defined by the end 38a of the throttle release pin. Such over-center action may also be considered as the movement of the pivot axis 36 from a position forward of pivot axis 38a (to the right of pivot axis 38a as viewed in FIG. 3) to a position rearwardly of pivot axis 38a (to the left of pivot axis 38a as viewed in FIG. 4). The compression spring 52 is selected so as to be compressed as the connecting rod 46 moves to its over-center condition, thereby causing the connecting rod to maintain the service brake pedal 18 and master cylinder 28 in a locked brake applying condition even though the operator's foot may be released from the brake lock pedal.

As the brake lock pedal 32 is actuated to lock the service brake pedal 18 in a braked condition, the end 38b of the throttle release pin 38 is rotated to a position closely adjacent and beneath the throttle pedal 14, as illustrated in FIG. 4. Thereafter, when it is desired to release the vehicle brakes to enable movement of the associated vehicle, depressing the throttle pedal 14 forces the release pin 38 to rotate about its end 38a which, being fixed to the links 34a,b, causes the brake lock pedal 32 and connecting rod 46 to be released from their over-center positions and return to their non-operating positions, thereby releasing and enabling return of the service brake pedal 18 to a non-braking condition to release the vehicle brakes.

While the brake lock system 10 has been described in conjunction with a hydraulic brake system, it may also be employed with a mechanical brake system. A hydraulic brake system is preferred, however, since it generally requires substantially less force application by the operator than conventional mechanical braking systems which do not employ master cylinders and hydraulic wheel cylinders to apply the wheel brakes.

Thus, in accordance with the present invention, a relatively simple yet highly efficient and economical brake lock system is provided which employs a novel over-center linkage arrangement adapted to be readily activated by depressing a brake lock pedal substantially simultaneously with depressing a service brake pedal so as to lock the service brake pedal in a braking condition, while enabling release of the over-center linkage arrangement and return of the service brake to a non-braking condition in response to actuation of a throttle pedal.

While a preferred embodiment of the present invention has been illustrated and described, it will be understood that changes and modifications may be made therein without departing from the invention in its broader aspects. Various features of the invention are defined in the following claims.

What is claimed is:

1. A brake lock system for a motorized wheeled vehicle having a throttle pedal operable to control the speed of travel of the vehicle, and brake means including a primary brake pedal operable to effect braking of the vehicle, said brake lock system comprising, in combination, a brake lock pedal positioned to enable selective actuation by an operator during actuation of said primary brake pedal, and linkage means including an over-center linkage arrangement interconnecting said brake lock pedal to said primary brake pedal such that selective actuation of said brake lock pedal during actuation of said primary brake pedal to effect vehicle braking is operative to move said over-center linkage arrangement to an over-center condition retaining said primary brake pedal in a braking condition, said linkage means further including release link means operatively associated with said over-center linkage arrangement and said throttle pedal in a manner to release said over-center linkage arrangement and enable movement of said primary brake pedal to a non-braking condition in response to actuation of said throttle pedal to effect vehicle movement, said linkage means including spring means operative to resiliently bias said primary brake pedal to its braking condition when said brake lock pedal is actuated, to move said over-center linkage arrangement to an over-center condition.

2. A brake lock system as defined in claim 1 wherein said primary brake pedal has a foot pedal portion facilitating application of foot pressure to said primary brake pedal by an operator, said brake lock pedal being positioned to enable engagement by an operator's foot during actuation of said primary brake pedal.

3. A brake lock system as defined in claim 1 wherein said primary brake pedal is supported for pivotal movement during actuation to effect vehicle braking, said linkage means including a connecting rod interconnecting said brake lock pedal to said primary brake pedal in a manner to maintain said primary brake pedal in a braking condition when said brake lock pedal is actuated, to move said over-center linkage arrangement to an over-center condition.

4. A brake lock system as defined in claim 3 wherein said brake lock pedal is interconnected to said connecting rod by means enabling normal braking actuation of said primary brake pedal without moving said brake lock pedal.

5. A brake lock system as defined in claim 1 wherein said release link means includes a throttle release pin having a first end portion operatively interconnected to said brake lock pedal so as to be rotated during actuation of said brake lock pedal, said throttle release pin having a second end portion adapted to be engaged by the throttle pedal when said over-center linkage arrangement is in its said over-center condition such that movement of said throttle pedal to effect vehicle movement is operative to release said over-center linkage arrangement from its over-center condition and thereby enable return of said primary brake pedal to a non-braking condition.

6. A brake lock system as defined in claim 1 wherein said over-center linkage arrangement includes pivot link means having first ends supported for pivotal movement about a first pivot axis, said pivot link means having second ends pivotally supporting said brake lock pedal for pivotal movement about a second pivot axis, and a connecting rod interconnecting said brake lock pedal to said primary brake pedal, said pivot link means and said connecting rod being cooperative to effect movement of said connecting rod to an over-center condition relative to said first pivot axis in response to actuation of said brake lock pedal, said release link means including a throttle release pin operative to move said connecting rod from its said over-center condition and enable return of said primary brake pedal to a non-braking condition in response to actuation of said throttle pedal.

7. A brake lock system as defined in claim 6 including a linear bearing operatively associated with said brake lock pedal in a manner enabling sliding engagement between said brake lock pedal and said connecting rod.

8. A brake lock system as defined in claim 1 including a hydraulic pressure cylinder operatively associated with said primary brake pedal so as to be pressurized upon actuation of said primary brake pedal to its said vehicle braking condition, said hydraulic pressure cylinder being operative to return said primary brake pedal to a non-braking condition upon release of said over-center linkage arrangement from an over-center condition.

9. In a motorized wheeled vehicle having a frame, a throttle pedal pivotally supported by said frame and operative to control vehicle speed, and a vehicle brake arrangement including a fluid pressure cylinder and a primary brake pedal selectively operable to effect vehicle braking; the combination therewith comprising a brake lock system including a brake lock pedal, linkage means pivotally supporting said brake lock pedal proximate said primary brake pedal so as to enable an operator to actuate said brake lock pedal substantially simultaneously with application of foot pressure to said primary brake pedal, a connecting rod interconnecting said brake lock pedal to said primary brake pedal, said connecting rod and said linkage means defining an over-center linkage arrangement adapted for movement to an over-center condition in response to predetermined actuation of said brake lock pedal so as to lock said primary brake pedal in a braking condition, and throttle release pin means operatively associated with said over-center linkage arrangement in a manner to effect release of said over-center condition and enable return of said primary brake pedal to a non-braking condition in response to actuation of the throttle pedal.

10. A brake lock system for a motorized wheeled vehicle having a throttle pedal operable to control the speed of travel of the vehicle, and brake means including a primary brake pedal operable to effect braking of the vehicle, said brake lock system comprising, in combination, a brake lock pedal positioned to enable selective actuation by an operator during actuation of said primary brake pedal, and linkage means including an over-center linkage arrangement interconnecting said brake lock pedal to said primary brake pedal such that selective actuation of said brake lock pedal during actuation of said primary brake pedal to effect vehicle braking is operative to move said over-center linkage arrangement to an over-center condition retaining said primary brake pedal in a braking condition, said linkage means further including release link means operatively associated with said over-center linkage arrangement and said throttle pedal in a manner to release said over-center linkage arrangement and enable movement of said primary brake pedal to a non-braking condition in response to actuation of said throttle pedal to effect vehicle movement, said release link means including a throttle release pin having a first end portion operatively interconnected to said brake lock pedal so as to be rotated during actuation f said brake lock pedal, said throttle release pin having a second end portion adapted to be engaged by the throttle pedal when said over-center linkage arrangement is in its said over-center condition such that movement of said throttle pedal to effect vehicle movement is operative to release said over-center linkage arrangement from its over-center condition and thereby enable return of said primary brake pedal to a non-braking condition.

11. A brake lock system for a motorized wheeled vehicle having a throttle pedal operable to control the speed of travel of the vehicle, and brake means including a primary brake pedal operable to effect braking of the vehicle, said brake lock system comprising, in combination, a brake lock pedal positioned to enable selective actuation by an operator during actuation of said primary brake pedal, and linkage means including an over-center linkage arrangement interconnecting said brake lock pedal to said primary brake pedal such that selective actuation of said brake lock pedal during actuation of said primary brake pedal to effect vehicle braking is operative to move said over-center linkage arrangement to an over-center condition retaining said primary brake pedal in a braking condition, said linkage means further including release link means operatively associated with said over-center linkage arrangement and said throttle pedal in a manner to release said over-center linkage arrangement and enable movement of said primary brake pedal to a non-braking condition in response to actuation of said throttle pedal to effect vehicle movement, said over-center linkage arrangement including pivot link means having first ends supported for pivotal movement about a first pivot axis, said pivot link means having second ends pivotally supporting said brake lock pedal for pivotal movement about a second pivot axis, and a connecting rod interconnecting said brake lock pedal to said primary brake pedal, said pivot link means and said connecting rod being cooperative to effect movement of said connecting rod to an over-center condition relative to said first pivot axis in response to actuation of said brake lock pedal, said release link means including a throttle release pin operative to move said connecting rod from its over-center condition and enable return of said primary brake pedal to a non-braking condition in response to actuation of said throttle pedal.

12. A brake lock system as defined in claim 11 including a linear bearing operatively associated with said brake lock pedal in a manner enabling sliding engagement between said brake lock pedal and said connecting rod.

* * * * *

UNITED STATES PATENT AND TRADEMARK OFFICE
CERTIFICATE OF CORRECTION

PATENT NO. : 4,867,289
DATED : September 19, 1989
INVENTOR(S) : Eldon W. Wooters It is certified that error appears in the above-identified patent and that said Letters Patent is hereby corrected as shown below:

Column 4, Line 9, After "36" insert a comma;

Column 4, Line 47, Cancel "ad" and insert -- and --;

Column 8, Line 3, Cancel "f" and insert -- of --.

Signed and Sealed this

Second Day of November, 1993

*Attest:*

BRUCE LEHMAN

*Attesting Officer*   *Commissioner of Patents and Trademarks*